United States Patent Office 2,860,742
Patented Nov. 18, 1958

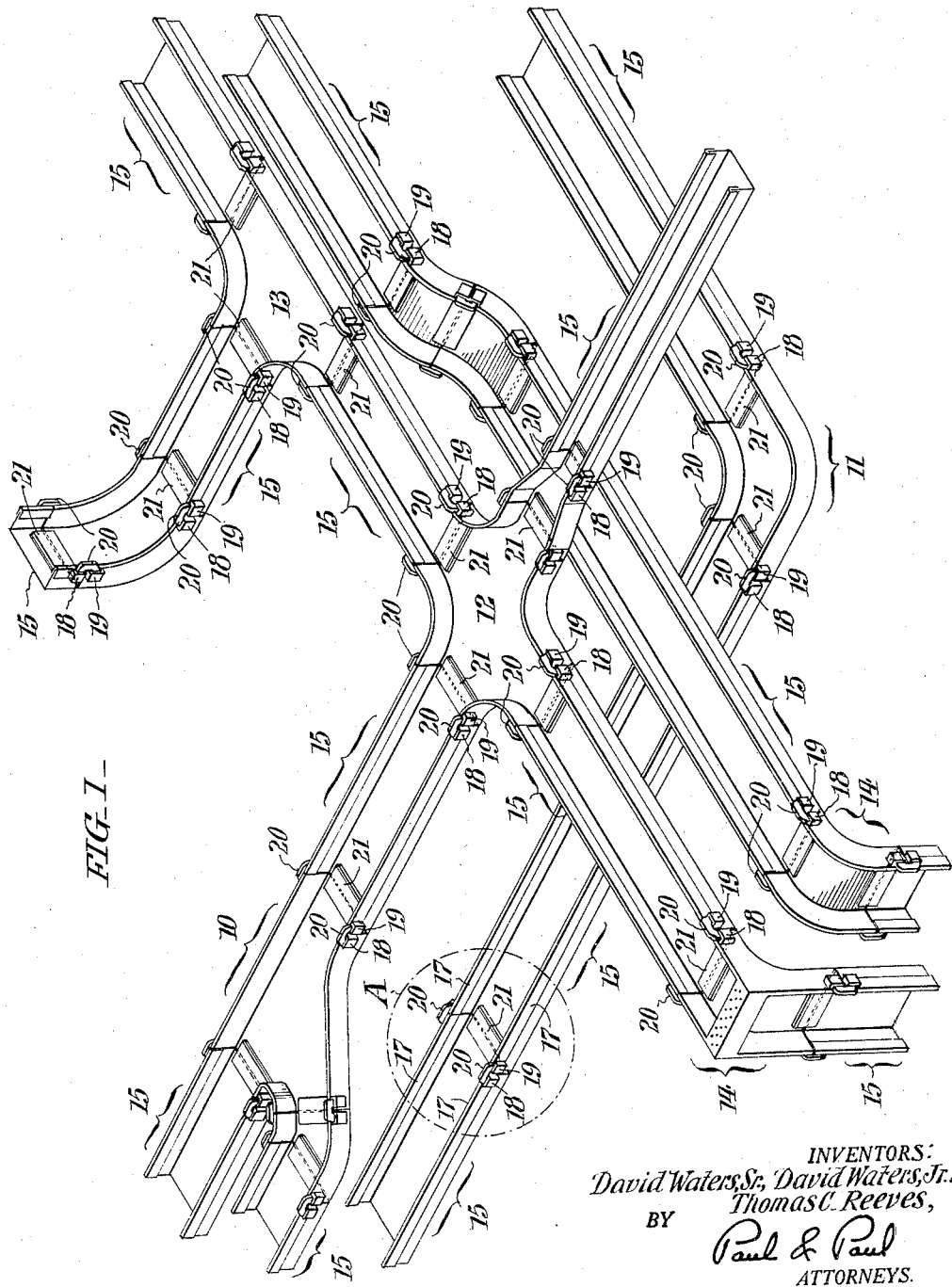

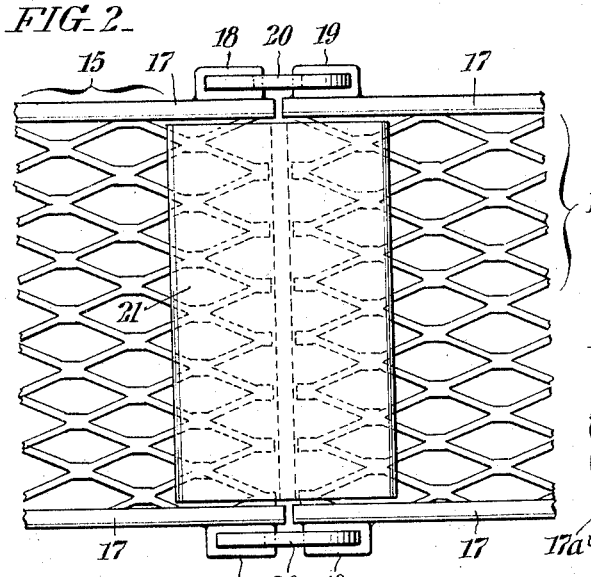
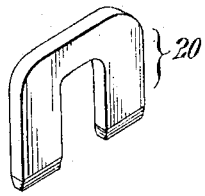
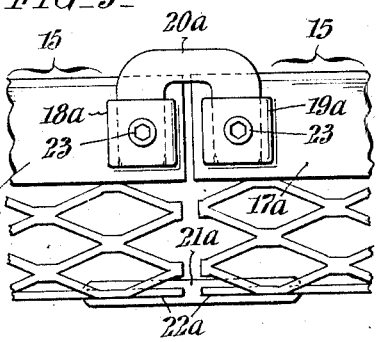
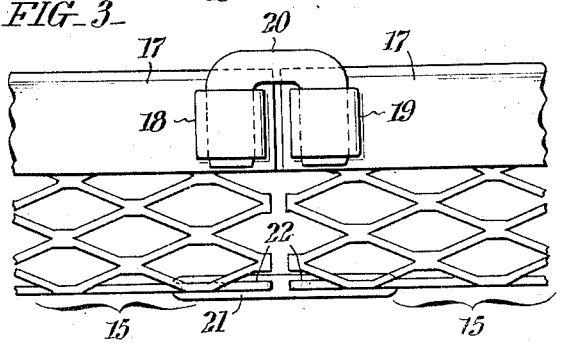

2,860,742

CONNECTING MEANS FOR CABLE-SUPPORTING TROUGH SYSTEMS AND THE LIKE

David Waters, Sr., Philadelphia, David Waters, Jr., Glenolden, and Thomas C. Reeves, Philadelphia, Pa., assignors to T. J. Cope, Inc., Philadelphia, Pa., a corporation of Pennsylvania Application January 5, 1955, Serial No. 479,982

1 Claim. (Cl. 189—36)

This invention relates to connecting means for use in erecting or setting up trough systems for the support of control and power cables in electric power stations, or of tubing in chemical processing plants and the like. More specifically, it is concerned with means for joining together, end to end, various pre-fabricated channel components of such systems, including straight-away sections, elbow fittings, T fittings, cross fittings etc., in a definite order or sequence with the channelling continuous or communicating, as may be necessary to suit special requirements likely to be met with in practice.

Our invention has for its chief aim, the provision of a simple reliable and inexpensive means by which the different pre-fabricated component parts of trough systems of the kind referred to can be rigidly connected together in the field in a minimum of time, without necessitating employment of specially skilled help or the use of any special tools in assembling.

Other objects and attendant advantages will appear from the following detailed description of the attached drawings, wherein:

Fig. 1 is a fragmentary view, in perspective, of a cable or tube-supporting trough system whereof the various pre-fabricated components are joined together, end to end, by connecting means conveniently embodying our invention in one form.

Fig. 2 is a fragmentary view, in top plan, and drawn to larger scale of a pair of straight-away trough components of the system joined by a connecting means conveniently embodying our invention in one form.

Fig. 3 is a fragmentary view showing the organization of Fig. 2 in side elevation.

Fig. 4 is a perspective view of one of the constituent parts of the connecting means; and Fig. 5 is a view generally similar to Fig. 3 showing a modification.

The cable or tube-supporting tray system exemplified in Fig. 1 is a typical one in which branch fittings 10, elbow fittings 11, cross fittings 12, T fittings 13 and drop fittings 14 are variously interposed between straight-away channel components 15 to form continuous or communicating ways into which the cables or tubes are to be laid.

In Figs. 2 and 3, we have illustrated how the confronting ends of two straight-away components 15 at the region A in Fig. 1 are joined together by one form of our improved connecting means, said components being shown as fashioned to channel configuration, in this instance, from expanded or reticulate sheet metal with the top edges of their side walls reinforced by permanently attached longitudinally folded enveloping strips 17 of solid sheet metal. It is to be understood, however, that our connecting means is equally applicable in joining trough channel sections or components of different specific construction, such as channel sections or components formed entirely of solid sheet metal or with solid sheet metal sides and expanded or reticulate metal bottoms and the like. As shown, the coupling means here comprises lugs 18 and 19 which are permanently affixed, as by welding, to the outer sides of the reinforcing strips 17 and which are vertically apertured for reception downwardly of the spaced prongs of U-shaped coupling elements 20 whereof one is separately illustrated in perspective in Fig. 4. The apertures in the lugs 18 and 19 are narrow and oblong in cross section in this instance in the direction of the length of the trough components, and the coupling elements 20 are formed from flat stout bar stock, the prongs being bevel-tipped and having a cross section corresponding to that of the apertures in said lugs to engage into said apertures with a tight fit. A fairing strip designated at 21, fashioned from heavy plate material is provided with grooves 22 in its longitudinal side edges to receive and marginally overlap the rough transverse end edges of the trough components 15 as best shown in Fig. 2. To connect the trough components their ends are brought into contiguous relation, and the fairing plate 21 is incidentally assembled with them. With this accomplished, the elements 20 are applied from above and their prongs inserted downwardly into the apertures in the corresponding pairs of lugs 18 and 19 on the reinforcing strips 17 of the trough components as in Figs. 2 and 3. Due to the firm interlock of the elements 20 and the lugs 18 and 19, the confronting ends of the trough sections are maintained rigidly in true alignment as will be readily understood from the drawings. In addition to bridging the gap between the two trough components and strengthening the juncture crosswise as well as longitudinally, the fairing plate 21, by marginally overlapping the raw transverse end edges of said components, serves as a means to prevent chafing or other injury to the cables or tubes subsequently placed in the completed composite trough.

The modification shown in Fig. 5 is identical with the form of our invention illustrated in Figs. 2–4 except that the lugs 18a and 19a on the reinforcing strips 17a of the trough components 15 are provided with set screws 23 which are threadedly engaged laterally into them upon tightening of the screws 23 their inner ends are brought to bear upon the prongs of the coupling elements 20a to prevent subsequent accidental dislodgement of the latter from the assembled juncture. As in the first described embodiment, a fairing plate 21a is here provided to bridge and to cover the transverse raw end edges of the two trough components 15.

From the foregoing it will be seen that we have provided simple and effective means whereby the confronting ends of straight-away and other components of cable or tube-supporting trough systems can be quickly connected together without the need for employing specially skilled help or the use of special tools other than an ordinary hammer and/or wrench. The same facility applies of course to disconnection of the trough components for the purpose of making desirable modifications in the trough system after its initial installation.

While the preferred embodiment of this invention has been described in some detail, it will be obvious to one skilled in the art that various modifications may be made without departing from the invention as hereinafter claimed.

Having thus described our invention, we claim:

Means for connecting, end to end in abutting relation, prefabricated channel units of cable or tube supporting trough systems or the like, said means comprising lugs affixed to the side walls of the trough units adjacent the confronting ends of said units, said lugs having extending downwardly through them, apertures which are narrow and oblong in the direction of the length of said units; and flat U-shaped coupling elements struck from stout plate metal, said elements having spaced prongs cross sectionally configured to correspond with the cross section of the apertures in the lugs and to engage downwardly into said apertures with a tight fit, thereby to insure maintenance of the connected abutted ends of the trough units rigidly in true axial alignment.

References Cited in the file of this patent

UNITED STATES PATENTS

| | | |
|---|---|---|
| 497,466 | Davidson | May 16, 1893 |
| 1,035,063 | Werner | Aug. 6, 1912 |
| 2,390,564 | Tedrow | Dec. 11, 1945 |

FOREIGN PATENTS

| | | |
|---|---|---|
| 553,797 | France | of 1923 |
| 616,399 | Great Britain | Jan. 20, 1949 |